United States Patent
Marcos Izquierdo et al.

(10) Patent No.: US 12,098,765 B2
(45) Date of Patent: Sep. 24, 2024

(54) POWER TRANSMISSION SYSTEM COMPRISING AN IMPROVED OIL RECOVERY CHANNEL

(71) Applicants: SAFRAN, Paris (FR); SAFRAN TRANSMISSION SYSTEMS, Colombes (FR)

(72) Inventors: Juan-Luis Marcos Izquierdo, Moissy-Cramayel (FR); Melody Elisabeth Laurent Cailler, Moissy-Cramayel (FR); Patrice Jocelyn Francis Gedin, Moissy-Cramayel (FR); Jean-Pierre Serey, Moissy-Cramayel (FR)

(73) Assignees: SAFRAN, Paris (FR); SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 18/254,142

(22) PCT Filed: Nov. 24, 2021

(86) PCT No.: PCT/FR2021/052078
§ 371 (c)(1),
(2) Date: May 23, 2023

(87) PCT Pub. No.: WO2022/117932
PCT Pub. Date: Jun. 9, 2022

(65) Prior Publication Data
US 2024/0003417 A1 Jan. 4, 2024

(30) Foreign Application Priority Data
Dec. 3, 2020 (FR) ........................ 2012574

(51) Int. Cl.
*F16H 57/04* (2010.01)
*F01D 15/12* (2006.01)
(Continued)

(52) U.S. Cl.
CPC ........... *F16H 57/043* (2013.01); *F01D 15/12* (2013.01); *F01D 25/18* (2013.01); *F02C 7/06* (2013.01);
(Continued)

(58) Field of Classification Search
CPC ..................... F01D 15/12; F01D 25/18; F05D 2260/40311; F05D 2260/98; F16H 1/28;
(Continued)

(56) References Cited

U.S. PATENT DOCUMENTS

6,223,616 B1 * 5/2001 Sheridan ............... F16H 1/2827
184/6.12
8,667,688 B2 * 3/2014 McCune ............... F16H 57/023
475/159
(Continued)

*Primary Examiner* — Topaz L. Elliott
*Assistant Examiner* — Jason G Davis
(74) *Attorney, Agent, or Firm* — WOMBLE BOND DICKINSON (US) LLP (57) ABSTRACT

A power transmission system for an aircraft turbine engine including a speed reducer including a ring gear that is able to rotate about an axis X, formed from half-rings having annular flanges clamped together by first fastener. The reducer includes an annular channel for recovering centrifuged oil, having a U-shaped cross section, extending around the flanges, this channel being formed by an axial assembly of at least two parts and forming a fairing for the flanges and the first fastener intended to limit aerodynamic disturbances.

10 Claims, 5 Drawing Sheets

(51) Int. Cl.
  *F01D 25/18* (2006.01)
  *F02C 7/06* (2006.01)
  *F02C 7/36* (2006.01)

(52) U.S. Cl.
  CPC ........... *F02C 7/36* (2013.01); *F16H 57/0471* (2013.01); *F16H 57/0486* (2013.01); *F05D 2260/40311* (2013.01); *F05D 2260/98* (2013.01); *F16H 57/0409* (2013.01)

(58) Field of Classification Search
  CPC ............. F16H 57/0421; F16H 57/0423; F16H 57/043; F16H 57/0486; F02C 7/36
  See application file for complete search history.

(56) References Cited

U.S. PATENT DOCUMENTS

| | | | |
|---|---|---|---|
| 8,858,388 B2 * | 10/2014 | McCune | F16H 1/28 475/159 |
| 10,082,105 B2 * | 9/2018 | McCune | F16H 57/04 |
| 10,281,025 B2 * | 5/2019 | Sheridan | F02C 3/04 |
| 11,125,318 B2 * | 9/2021 | Chevillot | F16H 57/0456 |

* cited by examiner

POWER TRANSMISSION SYSTEM COMPRISING AN IMPROVED OIL RECOVERY CHANNEL

TECHNICAL FIELD OF THE INVENTION

The field of the invention is that of the aircraft reducer power transmission systems, and more particularly that of oil recovery channels equipping a reducer of such a power transmission system.

TECHNICAL BACKGROUND

The prior art comprises in particular the documents FR-A1-3.084.427, US-B1-6.223.616, FR-A1-3.052.522 and FR-A1-3.084.407, FR-A1-3.081.513, FR-A1-3.095.243, FR-A1-3.095.243, and FR-A1-2.987.402.

Some turbomachines, such as turbofan engines equipped with a fan, or turboprop engines with a single propeller or twin counter-rotating propellers, are equipped with a power transmission system comprising mainly a differential epicyclic gear train reducer or a planetary gear train reducer (known by the acronym "RGB" for Reduction Gear Box). The differential reducers with epicyclic gear train, i.e., in which all the members are movable, are applicable to the turboprop engines with two propellers. The planetary reducers, i.e., where the planet carrier is stationary and the ring gear is movable, are used for single-propeller turboprop engines or turbofan engines equipped with a fan.

In the latter case, generally speaking, a power transmission shaft drives the fan shaft of the turbofan engine or the rotor shaft of the propellers by means of the speed reducer. The fan shaft or the propeller shaft is supported and guided by bearings which comprise rolling elements such as balls or rollers.

Such speed reducers are equipped with a number of rotating gear wheels and/or pinions, the lubrication of which is essential for the proper operation of the turbomachine and its yield. If the reducer is not sufficiently lubricated, the friction between the teeth of the gear wheels and/or pinions or at the level of the bearings will lead to premature wear and will also reduce the yield of the speed reducer. These bearings, gear wheels and/or pinions of the reducers can produce a high thermal power to ensure a good yield, which requires a lubrication system designed to deliver a large flow rate of oil, up to several thousand litres per hour, to lubricate and cool the speed reducer and the bearings. One of the disadvantages of such a lubrication system is the difficulty of recovering and evacuating such a large flow rate of oil.

The lubrication system comprises one or more casings forming an enclosure in which the speed reducer and the bearings are contained. The oil is generally evacuated towards the bottom portion of the enclosure, i.e., at "six o'clock". The enclosure also comprises evacuation means such as pipes that return the oil into the lubrication system. In the case of an epicyclic gear train speed reducer, in which the sun gear and the planet carrier are rotatable while the external ring gear is stationary, evacuation means are provided in the vicinity of a lower portion of the external ring gear so as to evacuate the oil from the internal portions of the speed reducer towards the radially internal portion of the enclosure.

In contrast, in the case of a planetary speed reducer with a rotating external ring gear, the evacuation is more complex. Indeed, when the external ring gear rotates, the oil is centrifugally projected onto the entire wall of the enclosure, which has a fairly large volume. The oil flows by gravity towards the radially internal portion of the enclosure for its evacuation. However, the recovery is not fast and efficient due to the high flow rate of oil circulating through the enclosure and through the lubrication system.

To overcome this disadvantage, epicyclic gear train speed reducers have been proposed with oil recovery systems that prevent the oil from accumulating in the enclosure by forming accumulation areas and that evacuate the oil quickly. Such a system comprises an annular channel arranged around the external ring gear of the speed reducer, responsible for the recovery of the oil and for channelling it towards an oil recovery chamber.

Such a channel is generally quite simple in shape and has a general U-shape in axial cross-section that matches the ring gear of the reducer.

The ring gear of the reducer is generally made up of two half-flanges with reversed toothings, assembled to each other by screwing means.

However, it has been found that, during the rotation of the ring gear, the screwing means, which protrude from the free faces of the flanges, tend to produce significant aerodynamic turbulence in the form of vortex flowing which, on the one hand, consume purely mechanical power and, on the other hand, disrupt the recovery of the oil.

PURPOSE OF THE INVENTION

The present invention therefore aims to provide a recovery system comprising an improved channel aiming to reduce such disturbances.

DESCRIPTION OF THE INVENTION

To this end, the invention proposes a power transmission system for an aircraft turbomachine, comprising:
  a speed reducer comprising a sun pinion which is rotatable about an axis X, a ring gear which is mobile in rotation about the axis X, and planet pinions carried by a planet carrier, meshing with the sun pinion and the ring gear, said ring gear comprising two half-ring gears each carrying teeth for meshing with the planet pinions and comprising radially oriented external annular flanges which are tightened against each other by first attachment means which pass through said flanges, axes Y of said first attachment means being parallel to the axis X and distributed over a circumference of diameter D1,
  an annular channel for recovering centrifuged oil extending around said flanges, said channel being generally U-shaped in axial cross-section surrounding the flanges and comprising an annular bottom wall of axis X connected to two annular lateral walls substantially perpendicular to the axis X,
  characterised in that:
  the annular lateral walls of the channel comprise internal peripheral edges having a predetermined internal diameter D2 less than the diameter D1,
  the bottom wall and the lateral walls of the channel are arranged, respectively, with respect to external peripheral edges of the flanges and with respect to the first screwing means with predetermined clearances J1 and J2,
  said predetermined internal diameter D2 and said predetermined clearances J1, J2 of the channel being configured so that the channel covers the flanges and the first attachment means, and in that the channel is formed by an axial assembly of at least two parts, a first part of which comprises at least one portion of the bottom wall, and a second part of which comprises one of the lateral walls.

The invention thus advantageously allows to propose a power transmission system in which the reducer comprises a channel forming a fairing placed as close as possible to the ring gear, consequently capable of limiting the aerodynamic disturbances induced by the first attachment means during the rotation of the ring gear. This leads to a reduction in mechanical losses and an improvement in the recovery of the oil.

According to other characteristics of the invention:
the first and second parts are attached to each other by second attachment means, the axes Z of which are parallel to the axis X and which are distributed over a circumference of diameter D3 greater than D1,
according to a first embodiment of the invention, the first part comprises one of the lateral walls, a portion of the bottom wall and a first annular attachment collar extending radially outwardly to form an attachment portion of the channel, and the second part comprises the other lateral walls and another part of the bottom wall, and a second annular attachment collar, the first and second collars being configured to be axially attached to each other.
according to a second embodiment of the invention, the first part comprises the bottom wall and a single annular attachment collar extending radially outwardly to form an attachment portion of the channel, the second part comprises one of the lateral walls of the channel and a third part of the channel comprises the other lateral wall,
the bottom wall and the external peripheral edges of the annular flanges of the half-ring gears are separated by the radial clearance J1 which is between 5 and 10 mm,
each of the lateral walls is separated from the first attachment means by the axial clearance J2 which is between 4 and 8 mm,
the internal diameter D2 is separated, in relation to a minimum diameter of a circumference passing through the first attachment means, by a radial clearance J3 of at most 1 mm.

The invention also relates to a method for assembling a transmission system according to the first embodiment, which comprises:
a first step in which the attachment portion of the first part is attached to an annular stationary casing of the reducer,
a second step in which the half-ring gears of the reducer are brought into position,
a third step in which the second part is attached to the first part.

The invention also relates to a method for assembling a transmission system according to the second embodiment This method is similar to the method for assembling the transmission system according to the first embodiment with the difference that during the third step the third part is also attached to the first part.

Finally, the invention concerns a turbomachine comprising a gas turbine coupled to a fan or to a propeller by means of a transmission system of the type described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
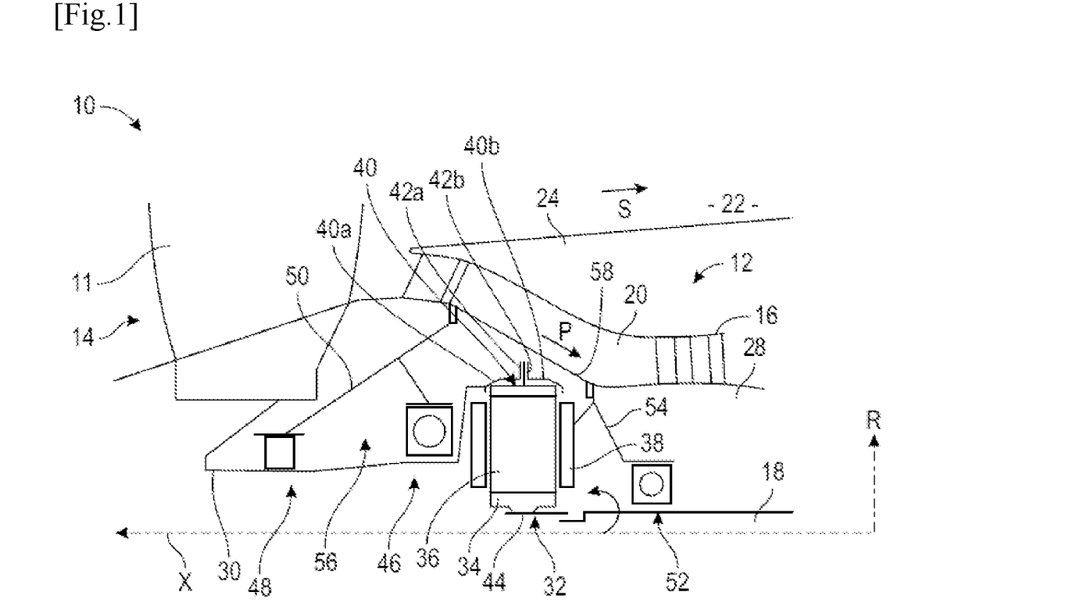
FIG. 1 shows an axial and partial cross-section of a turbomachine according to the prior art comprising a fan module whose fan shaft is driven by a power shaft via a speed reducer installed in a lubrication enclosure.

FIG. 1 shows a partial and axial sectional view of a turbomachine 10 with longitudinal axis X, in particular a turbofan engine to which the invention applies. Without limiting the scope of the invention, it can be applied, for example, to a turboprop or to a turbomachine comprising a doublet of counter-rotating propellers rotating about a longitudinal axis and referred to as an "open rotor", acronym for non-faired propeller.

The turbomachine 10 comprises an external nacelle (not shown) receiving a gas turbine 12 with a fan 14 mounted upstream. In the present invention, and in general, the terms "upstream" and "downstream" are defined with respect to the direction of the circulation of the gases in the turbomachine which is substantially parallel to the longitudinal axis X. Similarly, the terms "radial", "internal", "external", "lower", "upper", "below" and "above" are defined with respect to a radial axis R perpendicular to the longitudinal axis X and with respect to the distance from the longitudinal axis X. The gas turbine 12 comprises, for example, from upstream to downstream, a low pressure compressor 16, a high pressure compressor, a combustion chamber, a high pressure turbine and a low pressure turbine (not shown). The high pressure compressor is connected to the high pressure turbine via a high pressure shaft to form a high pressure body. Similarly, the low pressure compressor 16 is connected to the low pressure turbine via a low pressure shaft 18 to form a low pressure body. The low pressure shaft 18 and the high pressure shaft are centred on the longitudinal axis X.

The fan 14 is faired by a fan casing (not shown) which is secured to the external nacelle. The fan 14 compresses the air entering the turbomachine, which is divided into a primary flow P circulating in a primary annular duct 20, which passes through the gas turbine 12, and a secondary flow S circulating in a secondary annular duct 22 surrounding the gas turbine 12. In particular, the primary duct 20 and the secondary duct 22 are separated by an annular inter-duct casing 24 surrounding the gas turbine 2. The fan 14 comprises a series of blades 26 each extending radially outwards and delimited radially by the fan casing.

A fan module comprising the fan 14 is arranged upstream of an internal casing 28 of the turbomachine, which is passed through by a rotor shaft 30, in this case the fan shaft, which is centred on the longitudinal axis X. The fan shaft 30 is driven in rotation by a power shaft of the turbomachine via a power transmission system, allowing the rotational speed of the fan 14 to be reduced. This power shaft is the low pressure shaft 18 in this example. The power transmission system allows the arrangement of a fan with a large diameter which results in an increased bypass ratio.

The power transmission system comprises a speed reducer 32 formed by a gear train and known by the acronym RGB for "Reduction Gear Box". The speed reducer here is a planetary reducer.

This comprises, as illustrated schematically in FIG. 1, a pinion, referred to here as the sun gear 34, planet gears 36, a planet carrier 38, and an external ring gear 40, conventionally made up of two half-ring gears 40a, 40b, assembled by their flanges 42a, 42b with the aid of first axial attachment means such as screws and nuts, the internal teeth of which mesh with the planet gears 36. In the present example, the input of the speed reducer 32 is coupled to the low pressure shaft 18 while the output of the speed reducer 32 is coupled to the fan shaft 30.

The speed reducer 32 comprises an input shaft 44, centred on the longitudinal axis X, which is rotatably secured to the low pressure shaft 18 and to the sun gear 34 along the longitudinal axis X. The external ring gear 40, also centred on the longitudinal axis X, is secured in rotation to the fan shaft 30 about the longitudinal axis X. The planet gears 36, for example five in number, are carried by the planet carrier 38 which is mounted stationary. The planet gears 36 each rotate about an axis substantially parallel to the longitudinal axis X. Each of the planet gears 36, made in the form of a pinion, has teeth which mesh with those of the sun gear 34, in the form of a toothed wheel, and with the external ring gear 40, each half-ring gear of which is equipped with internal toothings of opposite pitch to one another. In operation, the sun gear 34 is driven in rotation by the low pressure shaft 18 at a first rotational speed. The planet gears 36 are driven in rotation by the sun gear 34 about their axis at a second rotational speed. The external ring gear 40, which meshes with the planet gears 36, is driven in rotation about the longitudinal axis X and drives the fan shaft 30. The external ring gear 40 rotates at a third rotational speed and in a direction opposite to that of the sun gear 34.

Alternatively, the speed reducer 32 could be an epicyclic gear train differential speed reducer. In this case, the sun gear, the planet gear, the planet carrier and the external ring gear would all be mobile.

As shown in FIG. 1, first and second bearings 46 and 48 allow to support and guide in rotation the fan shaft 10 so as to support the radial and axial loads that it undergone. These first and second bearings 46, 48 comprise rolling elements which are each mounted between a first and a second ring. Each first ring is mounted on the fan shaft 30 and each second ring is mounted on a shell 50. The rolling elements of the first bearing 46, mounted in the vicinity of the speed reducer 32, are balls, while the rolling elements of the second bearing 48 are rollers. The first and second bearings 46, 48 are mounted upstream of the speed reducer 32. More specifically, the second bearing 48 is mounted upstream of the first bearing 46. Similarly, a third bearing 52 guides the low pressure shaft 18 in rotation. This third bearing 18 is located downstream of the speed reducer 32. The third bearing 52 also comprises an internal ring carried by the low pressure shaft 18 and an external ring carried by a downstream support 24.

The first, second, and third bearings 46, 48, 52, and the gear wheels and pinions of the speed reducer 32 are contained within an annular lubrication enclosure 56 formed by one or more stationary casings 58 of the turbomachine. The shell 50 and the downstream support 54 are attached to the stationary annular casing 58. This stationary casing 26 is itself secured to the internal casing 28 of the turbomachine. The enclosure 56 extends axially and radially on either side of the speed reducer 32. As illustrated in FIG. 1, this enclosure 56 is axially passed through at least partly by the fan shaft 30 and the low pressure shaft 18.

A lubricant such as the oil is circulated in the enclosure 56 to permanently allow to lubricate and to cool the bearings and the rotating members of the speed reducer during the operation of the turbomachine in order to guarantee the correct operation of the bearings and of the speed reducer 32. For this purpose, a lubrication system (not shown) comprises pipes that spray oil through the planetary 34. The oil is injected into the rotating members at the level of the planet gears 36 and of the planetary 34 and then into the external ring gear 40 by centrifugation through ejection means (not shown). The oil is also injected at the level of the first, second and third bearings 56, 48, 52.

In such a reducer 32, the oil is generally projected by centrifugal force through the ring gear 40, the two half-ring gears of which 40a, 40b generally comprise oil passages. The oil then flows by gravity to a bottom point in the enclosure 56 where it is pumped back towards the reducer.

To prevent the oil from stagnating for too long on the walls of the enclosure 56, an annular oil recovery channel 62 is generally placed around the ring gear 40 to collect it.

However, it has been found that this recovery needs to be improved because the first attachment means which allow the half-ring gears 40a, 40b to be assembled together cause aerodynamic disturbances between their flanges 42a, 42b and the channel 62, in the form of vortex flowing which dissipate the mechanical power purely at a loss.

Figure 2:
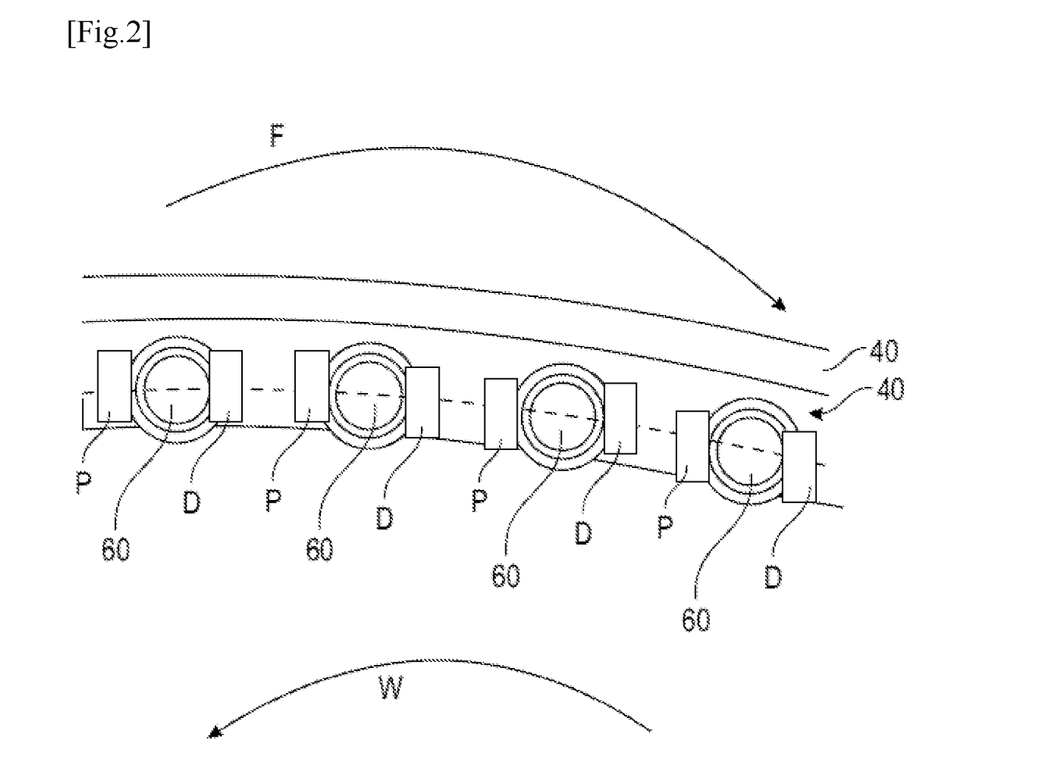
FIG. 2 is a schematic view illustrating the aerodynamic disturbances created by the attachment means of an external ring gear of a planetary gear train speed reducer according to the prior art during its rotation.

As illustrated in FIG. 2, which shows a flange 42a of the half-ring gear 40a equipped with first attachment means 60, when the ring gear 40 is rotated in the direction W, a force F is exerted on the first attachment means 60 exerted opposite to the movement due to the interaction between the air and the first attachment means. This force F creates pressure P and vacuum D fields on the first attachment means 60, represented by rectangles in FIG. 2.

These pressure differentials result in disturbed the flowing on the flanks of the flanges 40a, 40b, in the form of vortex flowing which result in the occurrence of mechanical energy losses. Indeed, the flowing of the air is disturbed around this entire geometry, with an inflow from the enclosure 56 outside the ring gear 40 towards the first attachment means 60 when the ring gear 40 accelerates its rotation, and an outflow of air towards the enclosure 56 when the ring gear 40 slows down.

The invention remedies this disadvantage by providing a channel 62 that limits these disadvantages.

To this end, the invention provides a power transmission system of the type previously described comprising an improved channel 62.

In a known manner, as illustrated in FIGS. 3 to 6, the centrifuged oil recovery channel 62 is annular, of axis X. It extends around the flanges 42a, 42b and comprises a generally U-shaped axial cross-section surrounding the flanges 42a, 42b. The first attachment means 60 comprises, for example, screws 68 which pass through the flanges 42a, 42b and which clamp the flanges together by means of nuts 70.

Axes Y of the first attachment means and thus of the screws 68 are parallel to the axis X and distributed over a circumference of diameter D1.

Also in a known manner, the channel 62 comprises an annular bottom wall 64 of axis X connected to two annular lateral walls 66a, 66b substantially perpendicular to the axis X.

In order to limit the turbulence produced by the first attachment means 60 during the rotation of the ring gear 40 between the flanges 42a, 42b and the channel 62, the latter is configured to constitute a fairing of the flanges 42a, 42b of the ring gear 40.

To this end, firstly, the annular lateral walls of the channel 66a, 66b comprise internal peripheral edges, 72a, 72b having a predetermined internal diameter D2 less than the diameter D1. In this way, the channel 62 covers the major part of the first screwing means 60, thus limiting the phenomenon of air from outside the channel 62 being sucked into it.

In addition, the channel 62 is configured to match closely to the first attachment means 60. To this end, the bottom wall 64 is arranged, with respect to external peripheral edges 43a, 43b of the flanges 42a, 42b, with a predetermined clearance J1, and the lateral 66a, 66b walls 66 of the channel 62 are arranged, with respect to the first attachment means 60, i.e., the ends of the screws 68, with a predetermined clearance J2.

Advantageously, the predetermined internal diameter D2 and the predetermined clearances J1, J2 of the channel 62 are configured such that the channel 62 covers the flanges 42a, 42b and the first attachment means 60, i.e., the screw 68. In this way, the channel 62 advantageously induces a disturbance-free air flowing between the first attachment means 60 and the channel 62 during the rotation of the ring gear 40.

The determination of this internal diameter D2 and of the predetermined clearances J1, J2 results from a calculation by means of a software for simulating the air flowing between the first attachment means 60, the flanges 42a, 42b, and the channel 62. These internal diameters D2 and clearances J1, J2 are thus calculated as accurately as possible to minimise the possibility of vortex flowing, and thus be adjusted so that the channel 62 is arranged as close as possible to the first attachment means 60, the flanges 42a, 42b, while maintaining a minimum distance in relation to these, taking into account the axial displacements of the ring gear 40 during its rotation, the manufacturing dispersions of the latter on its diameter, and the expansion of these parts during their operation.

As the channel 62 is arranged as close as possible to the first attachment means 60 of the flanges 42a, 42b, it is advantageous that this channel 62, to allow it to be mounted, is formed by an axial assembly of at least two parts, 74a, 74b, a first part 74a of which comprises at least one portion 64a of the bottom wall 64, and a second part 74b of which comprises one of the lateral walls 66b. The first and second parts 74a, 74b are attached to each other by second attachment means 76 comprising, for example, screws with axes Z parallel to the axis X and distributed over a circumference of diameter D3 greater than D1. The second attachment means 76 comprises for example screws 78.

Figure 3:
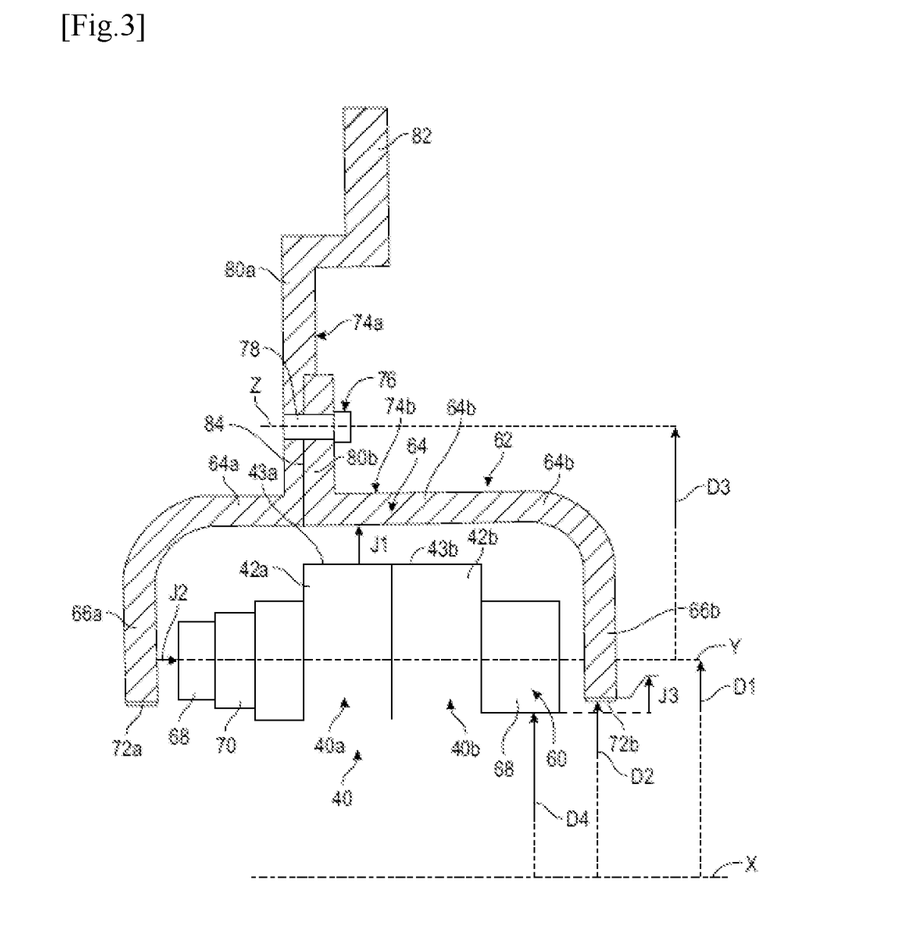
FIG. 3 is a schematic view, axial and partial of a lubricant recovery channel according to a first embodiment of the invention.
Figure 4:
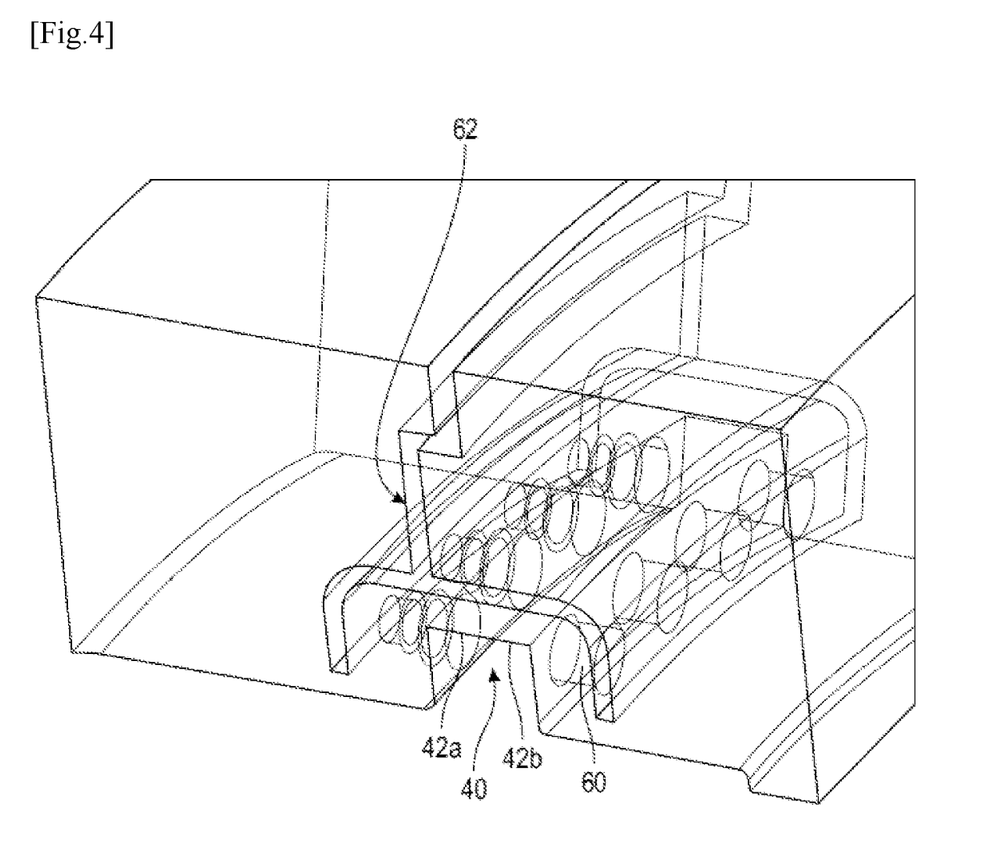
FIG. 4 is an axial cross-sectional view of the recovery channel according to the first embodiment mounted in a stationary casing of the turbomachine.
Figure 5:
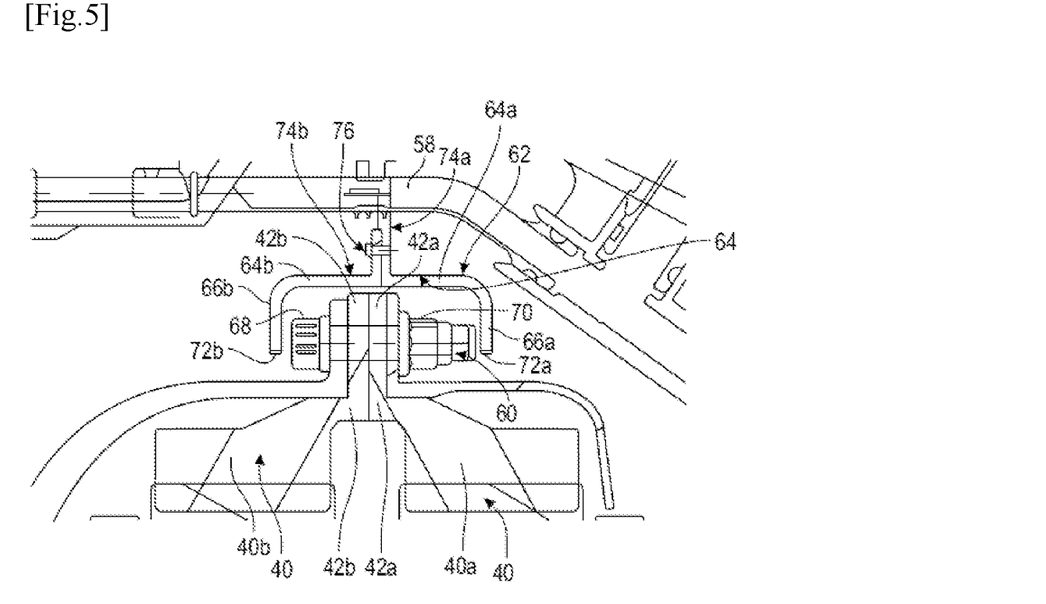
FIG. 5 is a partial phantom perspective view of the channel in FIG. 3.

According to a first embodiment of the invention which has been depicted in FIGS. 3, 4 and 5, the first part 74a comprises one of the lateral walls 66a, a portion 64a of the bottom wall 64 and a first annular attachment collar 80a extending radially outwards to form an attachment portion 82 of the channel 62. As illustrated in FIG. 5, which shows the channel 62 from the other side, it is through this attachment portion 82 that the channel 62 is attached to the annular casing 58 which surrounds the reducer.

In this first embodiment of the invention, the second part 74b comprises the other lateral wall 66b and another portion 64b of the bottom wall 64, and a second annular attachment collar 80b which is intended to be attached to the first collar 80a. It will be appreciated that the first and second collars 80a, 80b are configured to be axially attached to each other. To this end, and in a non-limiting manner of the invention, the first collar 80a comprises an annular gorge 84 in which the second collar 80b is received, and the two collars are assembled by the second attachment means 76, i.e., passed through by the screws 78 which assemble them to each other.

Figure 6:
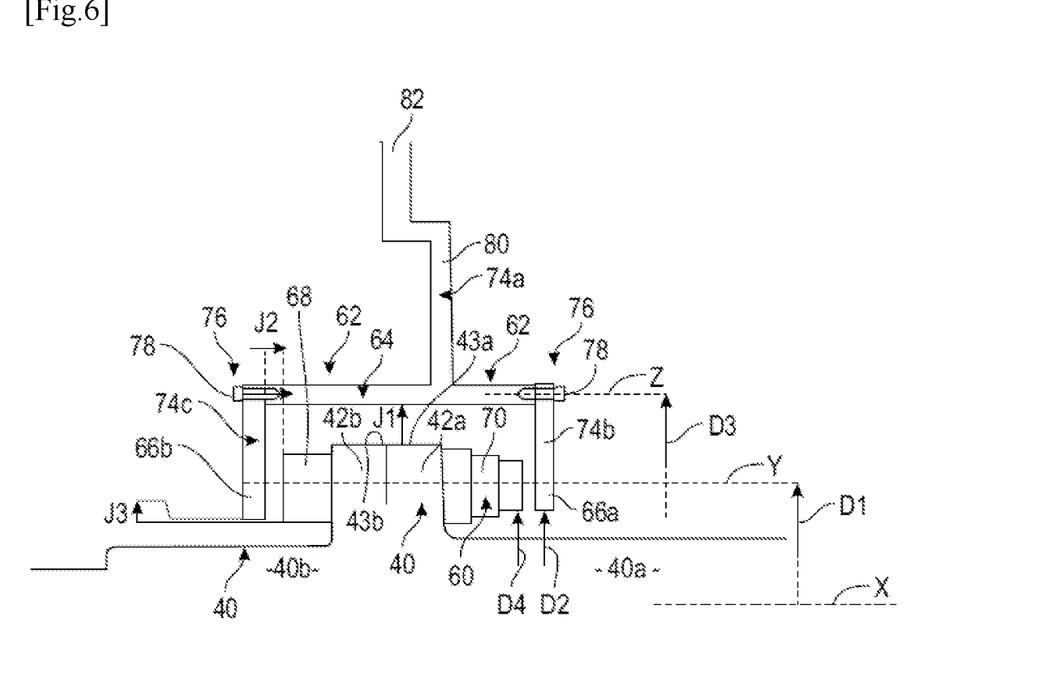
FIG. 6 is a schematic, axial and partial view of a lubricant recovery channel according to a second embodiment of the invention.

According to a second embodiment of the invention which has been shown in FIG. 6, the first part 74a comprises the bottom wall 64 and a single annular attachment collar 80 extending radially outwardly to form an attachment portion 82 of the recovery device, as before. The second part 74b comprises one of the lateral walls 66a of the channel 62 and a third part 74c of the channel comprises the other lateral wall 66b. The second part 74b and the third part 74c are attached on either side of the first part 74a, not as before at the level of the annular collar 80, but at the axial ends of the bottom wall 64, by means of second attachment means 76, i.e., preferably by means of screws 78 with axes Z. As before, the axes Z of the screws 68 are parallel to the axis X and distributed over a circumference of diameter D3 greater than D1.

By way of example, and in a non-limiting manner of the invention, in either of these two embodiments, the bottom wall 64 and the external peripheral edges 43a, 43b of the annular flanges 42a, 42b of the half-ring gears 40a, 40b are separated by a radial clearance J1 of between 5 and 10 mm. This clearance is a common value for a standard reducer, but may be less if the design of the oil evacuation system permits.

Each of the lateral walls 66a, 66b is separated from the first attachment means 68 by an axial clearance J2 of between 4 and 8 mm.

This range of values corresponds on the one hand to a minimum value of 4 mm of safety allowing to avoid a possible axial displacement of the ring gear accompanying an axial displacement of the reducer. On the other hand, the maximum value of 8 mm allows to ensure that there is not a high air velocity gradient between the first attachment means 68 and the channel, which would reduce the fairing effect of the channel and risk allowing the flowing to exit the channel.

The internal diameter D2 is separated from a minimum diameter D4 of a circumference passing through the first screwing means 68, which has been shown in FIGS. 3 and 6, by a radial clearance J3 of at most 1 mm. It will therefore be appreciated that the lateral walls 66a, 66b extend in line with the major portion of the first attachment means 68.

Figure 7:
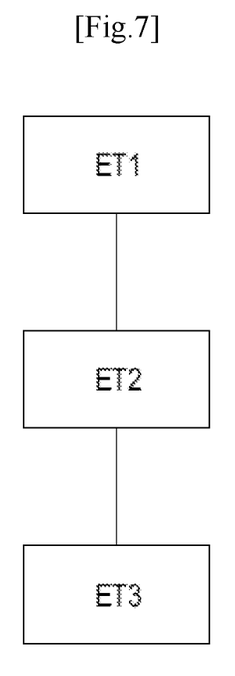
FIG. 7 is a block diagram illustrating the assembly steps of a transmission system according to the invention.

In this configuration, as illustrated in FIG. 3 and FIG. 7, a transmission system comprising a channel 62 according to the first embodiment of the invention may be assembled by a method comprising firstly a first step ET1 in which the attachment portion 82 of the first part 74a is attached to the stationary annular casing 58 of the reducer. Then, in a second step ET2, the half-ring gears of the reducer are brought into position. This operation being a reducer assembly operation widely known from the prior art, it will not be further detailed in this description.

Then, in a third step ET3, the second part 74b is attached to the first part 74a. In particular, the second collar 80b of the second part 74b is positioned in the annular gorge 84 of the first collar 80a of the first part 74a, and the two collars are then assembled by the second attachment means 76, i.e., passed through by the screws 78 which assemble them to each other.

The assembly of a transmission system according to the second embodiment of the invention is substantially similar. As illustrated in FIG. 6 and FIG. 7, it may be carried out by a method comprising a first step ET1 in which the attachment portion 82 of the first part 74 is attached to the stationary annular casing 58 of the reducer. Then, in a second step ET2, the half-ring gears 40a, 40b of the reducer are brought into position. Finally, in a third step ET3, the second and third parts 74b and 74c are attached to the first part 74a. In particular, the lateral walls 66a and 66b are attached to the ends of the bottom wall 64 by means of the second attachment means 76, i.e., in the case shown here, by means of the screws 78.

The invention therefore advantageously allows to provide a power transmission system comprising an oil recovery channel 62 that minimises the aerodynamic losses. Such a power transmission system can be used in a turbomachine comprising a gas turbine coupled to a fan or to a propeller by means of this power transmission system.

The invention claimed is:

1. A power transmission system for an aircraft turbomachine, comprising:
    a speed reducer comprising a sun pinion which can rotate about an axis X, a ring gear which is mobile in rotation about the axis X, and planet pinions carried by a planet carrier, meshing with the sun pinion and the ring gear, said ring gear comprising two half-ring gears each carrying teeth for meshing with the planet pinions and comprising radially oriented external annular flanges which are tightened against each other by first attachment means, which pass through said flanges, axes Y of said first attachment means being parallel to the axis X and distributed over a circumference of diameter D1,
    an annular channel for recovering centrifuged oil, extending around said flanges, this channel having in axial cross-section a general U shape surrounding the flanges and comprising an annular bottom wall parallel to the axis X connected to two annular lateral walls substantially perpendicular to the axis X,
    wherein:
    the annular lateral walls of the channel comprise internal peripheral edges having a predetermined internal diameter D2 less than the diameter D1,
    the bottom wall and the lateral walls of the channel are arranged, respectively, with respect to external peripheral edges of the flanges and with respect to the first attachment means with predetermined clearances J1 and J2,
    said predetermined internal diameter D2 and said predetermined clearances J1, J2 of the channel being configured such that the channel covers the flanges and the first attachment means,
    and in that the channel is formed by an axial assembly of at least two parts, a first part of which comprises at least one portion of the bottom wall, and a second part of which comprises one of the lateral walls.

2. The transmission system according to claim 1, wherein the first and second parts are attached to each other by second attachment means whose axes Z are parallel to the axis X and which are distributed over a circumference of diameter D3 greater than D1.

3. The transmission system according to claim 1, wherein:
    the first part comprises one of the lateral walls, a portion of the bottom wall and a first annular attachment collar extending radially outwardly to form an attachment portion of the channel, and
    the second part comprises the other lateral wall and another portion of the bottom wall, and a second annular attachment collar, the first and second collars being configured to be axially attached to each other.

4. The transmission system according to claim 1, wherein:
    the first part comprises the bottom wall and a single annular attachment collar extending radially outwardly to form an attachment portion of the channel,
    the second part comprises one of the lateral walls of the channel and,
    a third part of the channel comprises the other lateral wall.

5. The transmission system according to claim 1, wherein the bottom wall and the external peripheral edges of the annular flanges of the half-ring gears are separated by the radial clearance J1 which is between 5 and 10 mm.

6. The transmission system according to claim 1, wherein each of the lateral walls is separated from the first attachment means by the axial clearance J2 which is between 4 and 8 mm.

7. The transmission system according to claim 1, wherein the internal diameter D2 is separated, relative to a minimum diameter of a circumference passing through the first attachment means, by a radial clearance J3 of at most 1 mm.

8. A method for assembling a transmission system according to claim 1, wherein the method comprises:
    a first step (ET1) in which an attachment portion of the first part is attached to an annular stationary casing of the reducer,
    a second step (ET2) in which the half-ring gears of the reducer are brought into position,
    a third step (ET3) in which the second part is attached to the first part.

9. The method for assembling a transmission system according to claim 8, wherein during the third step (ET3) a third part is also attached to the first part.

10. A turbomachine comprising a gas turbine coupled to a fan or to a propeller by means of a transmission system according to claim 1.

* * * * *